United States Patent
Nakatani

(10) Patent No.: US 11,755,561 B2
(45) Date of Patent: Sep. 12, 2023

(54) ANALYSIS DEVICE, ANALYSIS SYSTEM, AND ANALYSIS METHOD

(71) Applicant: SHIMADZU CORPORATION, Kyoto (JP)

(72) Inventor: Takayuki Nakatani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 474 days.

(21) Appl. No.: 16/597,395

(22) Filed: Oct. 9, 2019

(65) Prior Publication Data

US 2020/0117652 A1 Apr. 16, 2020

(30) Foreign Application Priority Data

Oct. 11, 2018 (JP) .................. 2018-192655

(51) Int. Cl.
*G06F 16/23* (2019.01)
*G06N 3/08* (2023.01)
*G06N 3/04* (2023.01)

(52) U.S. Cl.
CPC ........... *G06F 16/2365* (2019.01); *G06N 3/04* (2013.01); *G06N 3/08* (2013.01)

(58) Field of Classification Search
CPC ........ G06F 16/2365; G06N 3/04; G06N 3/08; G06N 3/084; G06K 9/00503
See application file for complete search history.

(56) References Cited

U.S. PATENT DOCUMENTS 6,865,505 B2    3/2005  Harada et al.
7,133,789 B2   11/2006  Harada et al.
7,395,171 B2    7/2008  Harada et al.
7,630,923 B2   12/2009  Harada et al.
2003/0154044 A1* 8/2003 Lundstedt ........ G01N 35/00871
                                                    702/181

(Continued)

FOREIGN PATENT DOCUMENTS

CN        1444749 A      9/2003
CN      108327721 A      7/2018
WO     2001/093142 A1   12/2001

OTHER PUBLICATIONS

Office Action dated Apr. 8, 2023 in Chinese Application No. 201910965014.X.

*Primary Examiner* — Richard L Bowen
*Assistant Examiner* — Aryan D Toughiry
(74) *Attorney, Agent, or Firm* — Sughrue Mion, PLLC

(57) ABSTRACT

A case data set storage unit includes a plurality of case data sets including difference data representing, a variation from measurement data taken at an initial state to measurement data taken at a plurality of points of time for the same sample under the same measurement condition. An aging degradation estimation unit uses these case data sets to output difference data representing an estimate value of a variation from the measurement data taken at the initial state to measurement data taken, by a measurement device, at or after a first elapsed time, based on difference data representing a variation from the measurement data taken at the initial state to measurement data taken at a plurality of points of time that precede the first elapsed time. An aging degradation correction unit corrects the measurement data taken at or after the first elapsed time, based on the output difference data.

6 Claims, 9 Drawing Sheets

(56) References Cited

U.S. PATENT DOCUMENTS

| | | | |
|---|---|---|---|
| 2003/0158794 A1* | 8/2003 | Harada | G16H 40/67 |
| | | | 705/28 |
| 2005/0119855 A1 | 6/2005 | Harada et al. | |
| 2005/0123448 A1 | 6/2005 | Harada et al. | |
| 2005/0123449 A1 | 6/2005 | Harada et al. | |
| 2018/0054379 A1* | 2/2018 | Bursell | H04L 41/5038 |
| 2018/0204393 A1* | 7/2018 | Landolsi | F02M 35/021 |
| 2018/0307741 A1* | 10/2018 | Kida | G06N 20/00 |
| 2020/0012940 A1* | 1/2020 | Liu | G06T 3/4007 |

* cited by examiner

FIG.2

| CASE DATA SET No. | D(t1) | D(t2) | ... | D(tm-1) | D(tm) | D(tm+1) | ... | D(tn) |
|---|---|---|---|---|---|---|---|---|
| 1 | | | ... | | | | ... | |
| 2 | | | ... | | | | ... | |
| 3 | | | ... | | | | ... | |
| ... | ... | ... | ... | ... | ... | ... | ... | ... |

FIG.4A

| R(t0) | R(t1) | R(t2) | ... | R(tm-1) | R(tm) | R(tm+1) | ... | R(tn) |
|---|---|---|---|---|---|---|---|---|

FIG.4B

| D(t1) | D(t2) | ... | D(tm-1) | D(tm) | D(tm+1) | ... | D(tn) |
|---|---|---|---|---|---|---|---|

ESTIMATE DATA

FIG.4C

| R'(tm) | R'(tm+1) | ... | R'(tn) |
|---|---|---|---|

FIG.8A

| SAMPLE NAME | MEASUREMENT CONDITION | R(t0) | R(t1) | R(t2) | ... | R(tm-1) | R(tm) | R(tm+1) | ... | R(tn) |
|---|---|---|---|---|---|---|---|---|---|---|
| α | 2 | ⌐⌐ | ∧ | ∧ | ... | ∧ | ∧ | ∧ | ... | ∧ |
| ... | ... | ... | ... | ... | ... | ... | ... | ... | ... | ... |

FIG.8B

| D(t1) | D(t2) | ... | D(tm-1) | D(tm) | D(tm+1) | ... | D(tn) |
|---|---|---|---|---|---|---|---|
| ∧ | ∧ | ... | ∧ | ∧ | ∧ | ... | ∧ |
| ... | ... | ... | ... | ... | ... | ... | ... |

ANALYSIS DEVICE, ANALYSIS SYSTEM, AND ANALYSIS METHOD

BACKGROUND OF THE INVENTION

Field of the Invention

The present invention relates to an analysis device, an analysis system, and an analysis method.

Description of the Background Art

An analysis device contains consumables such as detector lamp and column. Depending on the number of times consumables have been used, the result of an analysis may vary due to deformation of peak shape or shift of retention time for example, even when the analysis is conducted on the same sample under the same analysis condition. In order to correct the variation of the analysis result, a standard sample is analyzed in advance to store the analysis result as an analysis result in the past. A new analysis result can be compared with the past analysis result to detect a variation of the new analysis;result. Moreover, from a plurality of past analysis results, a variation of an analysis result can be estimated to correct the analysis result.

For example, WO2001/093142 discloses means for correcting a measurement result based on the number of times consumables have been used and the lot number.

For analyzing a standard sample in advance, however, the analysis of the standard sample is required as an additional analysis, which increases the cost.

Moreover, for making a correction based on past analysis results, it is necessary for a user of an analysis device to have adequate past analysis results. For a new sample that has not been analyzed or new analysis condition that has not been applied, past analysis results cannot be used. Further, because samples used for measurement, measurement conditions, and raw measurement data include information to be protected such as know how and product information, the past analysis results are difficult to share with other users.

Further, influences, on an analysis result, of the number of times consumables have been used vary greatly depending on analysis conditions. Therefore, the mere use of past analysis results for the same consumable and the same lot number does not facilitate estimation of a variation of a new analysis result.

SUMMARY OF THE INVENTION

It is therefore an object of the present invention to provide an analysis device, an analysis system, and an analysis method that enable correction of a variation of measurement data resultant from aging degradation of a measurement device, without use of information about the sample subjected to measurement, measurement conditions, and raw measurement data.

An analysis device of the present disclosure includes:
a case data set storage unit that stores a plurality of case data sets;
a measurement data acquisition unit that acquires measurement data taken by a measurement device at an initial state and at a plurality of points of time;
a difference data generation unit that generates difference data representing a variation from the measurement data taken at the initial state to measurement data taken at each of the plurality of points of time that precede a first elapsed time;

an aging degradation estimation unit that receives the difference data generated by the difference data generation unit at the plurality of points of time preceding the first elapsed time to output difference data representing an estimate value of a variation from the measurement data taken at the initial state to measurement data taken at or after the first elapsed time, based on the plurality of case data sets; and an aging degradation correction unit that corrects the measurement data taken at or after the first elapsed time, based on the difference data output from the aging degradation estimation unit. The plurality of case data sets each include difference data representing a variation from measurement data taken at an initial state to measurement data taken at each of a plurality of points of time, for a same sample under a same measurement condition.

Thus, a variation of measurement data due to aging degradation of the measurement device can be corrected without use of information about the sample subjected to measurement, measurement conditions, and raw measurement data.

Preferably, the aging degradation estimation unit is configured to output the difference data representing the estimate value of the variation from the measurement data taken at the initial state to the measurement data taken at or after the first elapsed time, by inputting, to an aging degradation model, the difference data generated by the difference data generation unit at the plurality of points of time preceding the first elapsed time. The aging degradation model is learned using the plurality of case data sets i) to receive, as an input, difference data representing a variation from measurement data taken at an initial state to measurement data taken at a plurality of points of time after the initial state and before the first elapsed time, and ii) to provide, as an output, difference data representing a variation from the measurement data taken at the initial state to measurement data taken at and after the first elapsed, time.

Thus, the case data sets are used to learn the aging degradation model and use the learned aging degradation model to thereby obtain an estimate value of a variation from the measurement data taken at the initial state to measurement data taken at or after the first elapsed time.

Preferably, the aging degradation model is configured as a neural network.

Thus, the neural network excellent in learning capability can be used to learn the case data sets.

Preferably, the aging degradation correction unit is configured to subtract the difference data output from the aging degradation estimation unit from the measurement data taken at or after the first elapsed time.

Preferably, the measurement data is waveform data.

Thus, a variation from an initial state of waveform data such as frequency spectrum, due to aging degradation of the measurement device, can be corrected.

An analysis system of the present disclosure includes:
the analysis device; and
one or more data management devices. The one or more data management devices each include:
an original data storage unit that manages an original data set, the original data set including a sample name and an identifier for a measurement condition, and measurement data taken at an initial state and measurement data taken at a plurality of points of time;
a case data set generation unit that generates the case data sets by (i) deleting the sample name and the identifier for the measurement condition from the original data set, and (ii)

subtracting the measurement data taken at the initial state from the measurement data taken at each of the plurality of points of time; and a transmission unit that transmits the case data sets to the analysis device. The analysis device includes a reception unit that receives the case data sets.

Thus, each data management device can generate and provide to the analysis device a case data set that is made up of difference data representing a variation from the initial state and that does, not include information to be protected such as sample subjected to measurement, measurement conditions and raw measurement data included in the original data set.

An analysis method of the present disclosure includes:

generating, by a data management device, case data sets by (i) deleting, from an original data set including (a) a sample name and an identifier for a measurement condition and (b) measurement data taken at an initial state and measurement data taken at a plurality of points of time, the sample name and the identifier for the measurement condition, and (ii) subtracting the measurement data taken at the initial state from the measurement data taken at each of the plurality of points of time:

transmitting, by the data management device, the case data sets to an analysis device;

receiving the case data sets by the analysis device;

learning, by the analysis device, an aging degradation model through use of the case data sets, wherein the aging degradation model is learned (i) to receive, as an input, difference data representing a variation from the measurement data taken at the initial state to the measurement data taken at a plurality of points of time after the initial state and before a first elapsed time, and (ii) to provide, as an output, difference data representing a variation from the measurement data taken at the initial state to measurement data taken at and after the first elapsed time;

acquiring, by the analysis device, measurement data taken by a measurement device at an initial state and a plurality of points of time;

outputting, by the analysis device, difference data representing an estimate value of a variation from measurement data taken at an initial state to measurement data taken at or after the first elapsed time, by inputting, to the learned aging degradation model, difference data representing a variation from the measurement data taken by the measurement device at the initial state to measurement data taken by the measurement device at a plurality of points of time after the initial state and before the first elapsed time; and correcting, by the analysis device, the measurement data taken at or after the first elapsed time, based on the output difference data.

Thus, a variation of measurement data due to aging degradation of the measurement device can be corrected without use of information about the sample subjected to measurement, measurement conditions, and raw measurement data.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows an example of a plurality of case data sets.

FIG. 4A shows an example of measurement data $R(t_0)$ to $R(t_n)$, FIG. 4B shows an example of difference data $D(t_1)$ to $D(t_{m-1})$ and difference data $D(t_m)$ to $D(t_n)$, and FIG. 4C shows an example of corrected measurement data $R'(t_m)$ to $R'(t_n)$.

FIG. 8A shows an example of an original data set, and FIG. 8B shows an example of a case data set.

DESCRIPTION OF THE PREFERRED EMBODIMENTS

In the following, embodiments are described with reference to the drawings.

First Embodiment

Figure 1:
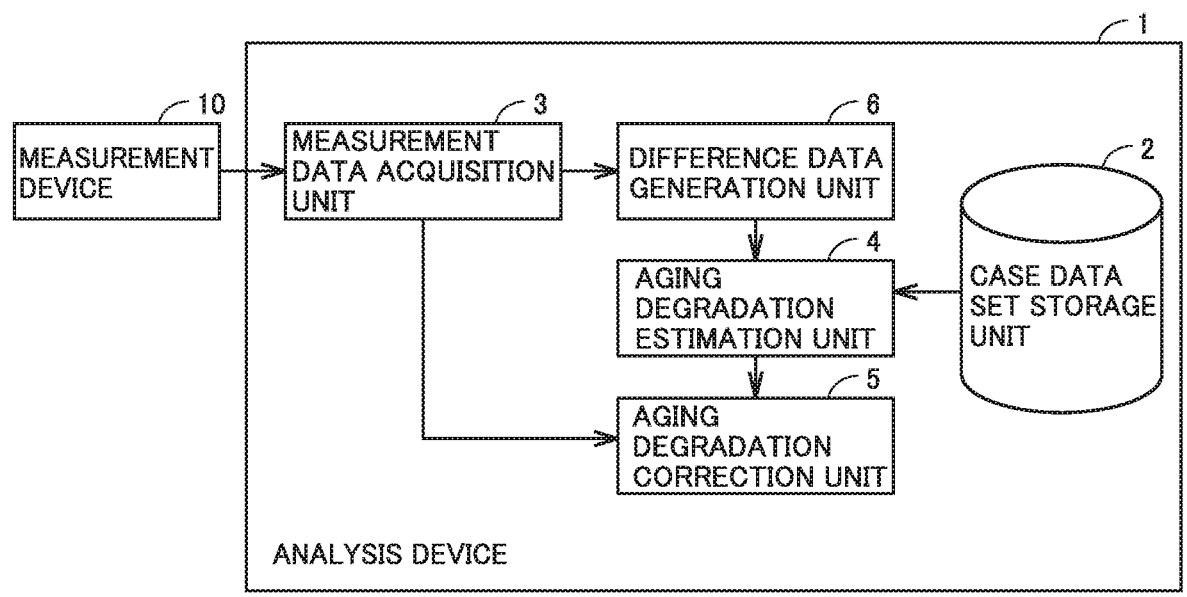
FIG. 1 shows a configuration of an analysis device 1 according to a first embodiment.

FIG. 1 shows a configuration of an analysis device 1 according to a first embodiment.

Analysis device 1 includes a measurement data acquisition unit 3, a difference data generation unit 6, a case data set storage unit 2, an aging degradation estimation unit 4, and an aging degradation correction unit 5.

Case data set storage unit 2 stores a plurality of case data sets. Each case data set includes difference data representing a variation from measurement data taken at an initial state to measurement data taken at each of a plurality of points of time, for the same sample under the same measurement condition.

Examples of the sample include blood, caffeine, and nicotine, for example. Examples of the measurement condition include conditions relating to degradation of consumables and measurement data, such as analysis time, temperature, pressure, liquid flow rate, type of consumable, for example. Examples of the measurement data include chromatogram that is output from a chromatography detector, and frequency spectrum, for example.

FIG. 2 shows an example of a plurality of case data sets.

A case data set stores difference data $D(t_1)$ to $D(t_n)$ representing respective variations from measurement data taken at initial state $t_0$ to measurement data taken at respective points of time $t_1$ to $t_n$. The intervals between the points of time may be several hours, one day, one month, or several months, for example. The measurement data may be waveform data. Alternatively, the measurement data may be numerical data.

Assuming that the initial state is to and measurement data taken at respective points of time $t_0$ to $t_n$ are $R(t_0)$ to $R(t_n)$, difference data $D(t_i)$ to $D(t_n)$ are represented by the following formula.

$$D(t_i) = R(t_i) - R(t_0) \quad (i=1 \text{ to } n) \qquad (1)$$

A plurality of case data sets are generated from measurement data taken by a measurement device 10 or a plurality of other measurement devices. For example, a plurality of case data sets are generated from measurement data taken by a measurement device(s) used by a plurality of users.

These case data sets do not include the sample subjected to measurement, measurement conditions, and raw measurement data. The measurement data is only indicated as a difference from the initial state. In the present embodiment, therefore, information to be protected, such as know how and product information that a plurality of users have, is not used.

A single case data set is generated from measurement data taken for the same sample under the same measurement condition, and therefore, the difference data can be regarded as data representing only a variation due to aging degradation.

Referring to FIG. 1 again, measurement data acquisition unit 3 acquires measurement data $R(t_0)$ to $R(t_n)$ taken at initial state $t_0$ and at a plurality of points of time $t_1$ to $t_n$ by measurement device 10 connected to analysis device 1.

Difference data generation unit 6 generates difference data $D(t_1)$ to $D(t_{m-1})$ representing respective variations from measurement data $R(t_0)$ taken at the initial state to measurement data $R(t_1)$ to $R(t_{m-1})$ taken at a plurality of points of time $t_1$ to $t_{m-1}$ that precede a first elapsed time $t_m$.

Aging degradation estimation unit 4 receives difference data $D(t_1)$ to $D(t_{m-1})$ at a plurality of points of time generated by difference data generation unit 6 to output difference data $D(t_m)$ to $D(t_n)$ representing respective estimate values of variations from the measurement data taken at the initial state to measurement data taken at and after first elapsed time tm, based on a plurality of case data sets stored in case data set storage unit 2.

More specifically, aging degradation estimation unit 4 uses the plurality of case data sets to learn an aging degradation model AGM. Aging degradation model AGM receives the difference data $D(t_1)$ to $D(t_{m-1})$ representing respective variations from the measurement data taken at the initial state to the measurement data taken at a plurality of points of time $t_1$ to $t_{m-1}$ after the initial state and before the first elapsed time $t_m$. Then, aging degradation model AGM outputs difference data $D(t_m)$ to $D(t_n)$ representing respective variations from the measurement data taken at the initial state to the measurement data taken at and after first elapsed time $t_m$. Aging degradation estimation unit 4 inputs, to the aging degradation model AGM learned based on the plurality of case data sets, difference data $D(t_1)$ to $D(t_{m-1})$ at a plurality of points of time $t_1$ to $t_{m-1}$ preceding first elapsed time $t_m$ that are generated by difference data generation unit 6, to obtain difference data $D(t_m)$ to $D(t_n)$ representing respective estimate values of variations from the measurement data taken at the initial state to the measurement data taken at and after first elapsed time $t_m$.

It is required that difference data $D(t_1)$ to $D(t_{m-1})$ that are input to aging degradation model AGM represent only the variations due to aging degradation and do not include any variation due to other factors (sample, measurement condition, for example). Difference data $D(t_m)$ to $D(t_n)$ that are output from aging degradation model AGM also represent only the variations due to aging degradation.

Figure 3:
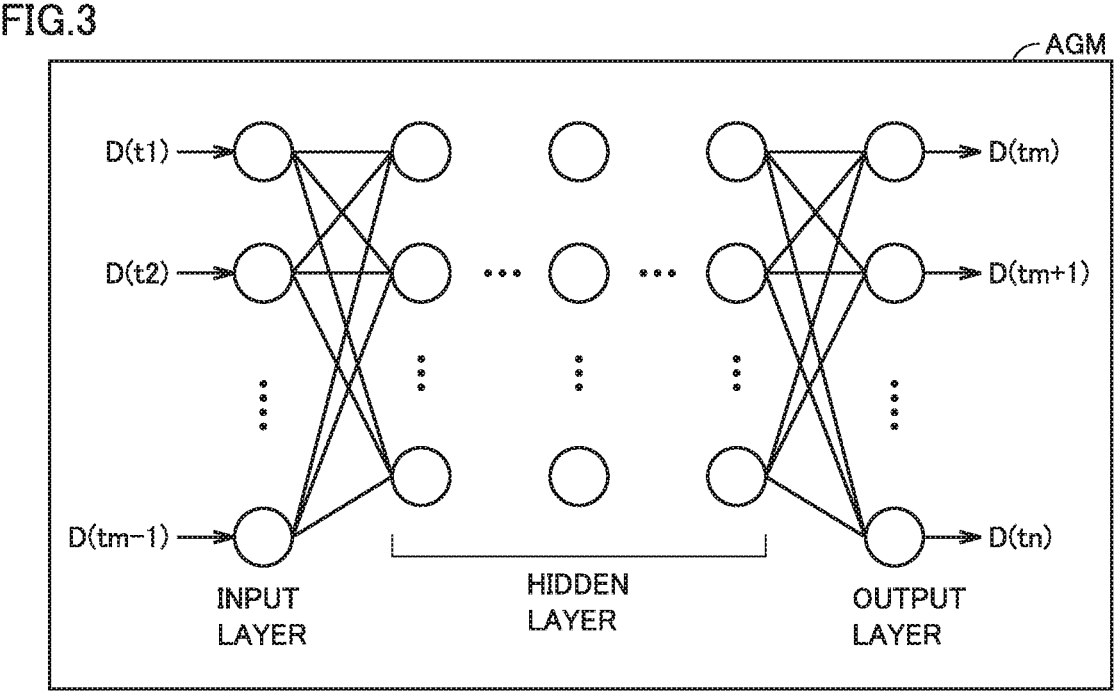
FIG. 3 shows a configuration of an aging degradation model AGM.

FIG. 3 shows a configuration of aging degradation model AGM.

As shown in FIG. 3, aging degradation model AGM may be configured as a neural network.

In learning, difference data $D(t_1)$ to $D(t_{m-1})$ of the case data set are input to an input layer of the neural network. Neural network parameters are learned through back propagation so as to minimize an error between data that is output from an output layer and difference data $D(t_m)$ to $D(t_n)$ of the case data set.

In estimating aging degradation, difference data $D(t_1)$ to $D(t_{m-1})$ for measurement data $R(t_0)$ to $R(t_{m-1})$ that are output from measurement device 10 are input to the input layer of the neural network. From the output layer of the neural network, estimate values, i.e., difference data $D(t_m)$ to $D(t_n)$ are output.

Aging degradation correction unit 5 uses difference data $D(t_m)$ to $D(t_n)$ that are output from aging degradation estimation unit 4 to correct measurement data $R(t_m)$ to $R(t_n)$ taken at and after first elapsed time $t_m$. More specifically, aging degradation correction unit 5 subtracts difference data $D(t_m)$ to $D(t_n)$ that are output from aging degradation estimation unit 4 from measurement data $R(t_m)$ to $R(t_n)$ taken at and after first elapsed time $t_m$ to thereby output corrected measurement data $R'(t_m)$ to $R'(t_n)$. In this way, measurement data from which influences of aging degradation have been eliminated is obtained. In other words, measurement data (i.e., correct measurement data) is obtained that is expected to be obtained at initial state to at which aging degradation of measurement device 10 has not occurred.

FIG. 4A shows an example of measurement data $R(t_0)$ to $R(t_n)$. FIG. 4B shows an example of difference data $D(t_1)$ to $D(t_{m-1})$ and difference data $D(t_m)$ to $D(t_n)$. FIG. 4C shows an example of corrected measurement data $R'(t_m)$ to $R'(t_n)$.

Difference data generation unit 6 generates difference data $D(t_1)$ to $D(t_{m-1})$ from measurement data $R(t_0)$ to $R(t_{m-1})$ taken by measurement device 10.

Aging degradation estimation unit 4 generates difference data $D(t_m)$ to $D(t_n)$ from difference data $D(t_1)$ to $D(t_{m-1})$.

Aging degradation correction unit 5 generates measurement data $R'(t_m)$ to $R'(t_n)$ by correcting measurement data $R(t_m)$ to $R(t_n)$ based on difference data $D(t_m)$ to $D(t_n)$.

Figure 5:
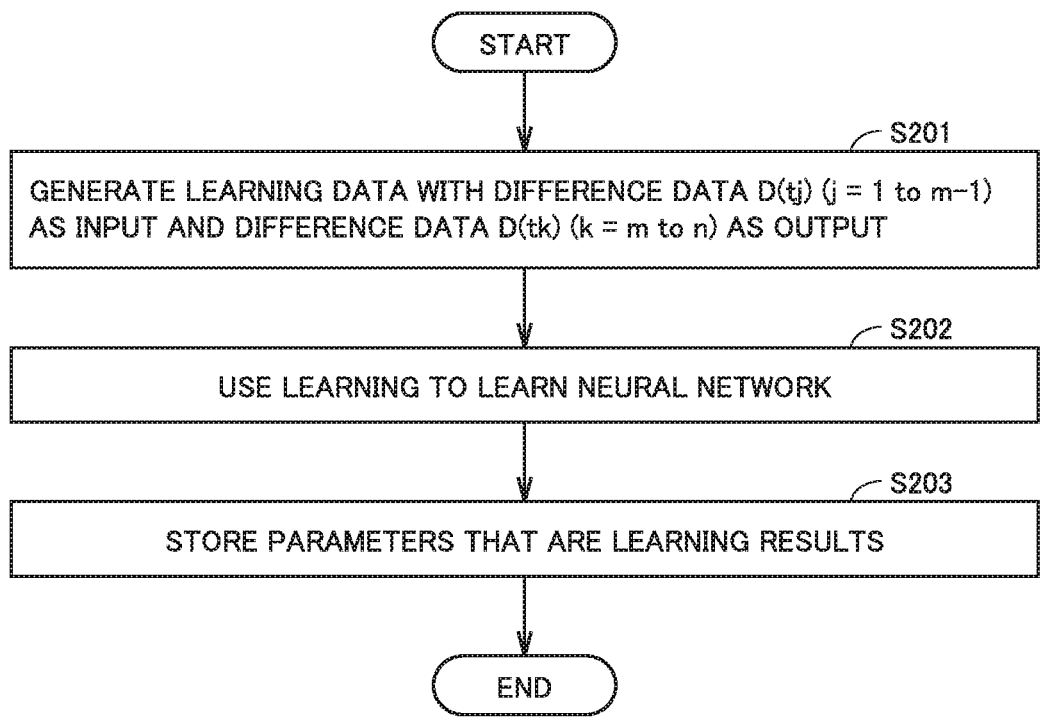
FIG. 5 is a flowchart showing a learning procedure for analysis device 1 according to the first embodiment.

FIG. 5 is a flowchart showing a learning procedure for analysis device 1 according to the first embodiment.

In step S201, aging degradation estimation unit 4 generates learning data with difference data $D(t_j)$ (j=1 to m−1) at points of time $t_1$ to $t_{m-1}$ as input and difference data $D(t_k)$ (k=m to n) at points of time $t_m$ to $t_n$ as output that are included in the case data set.

In step S202, aging degradation estimation unit 4 uses the learning data to learn the neural network in FIG. 3.

In step S203, aging degradation estimation unit 4 stores neural network parameters that are leaning results.

Figure 6:
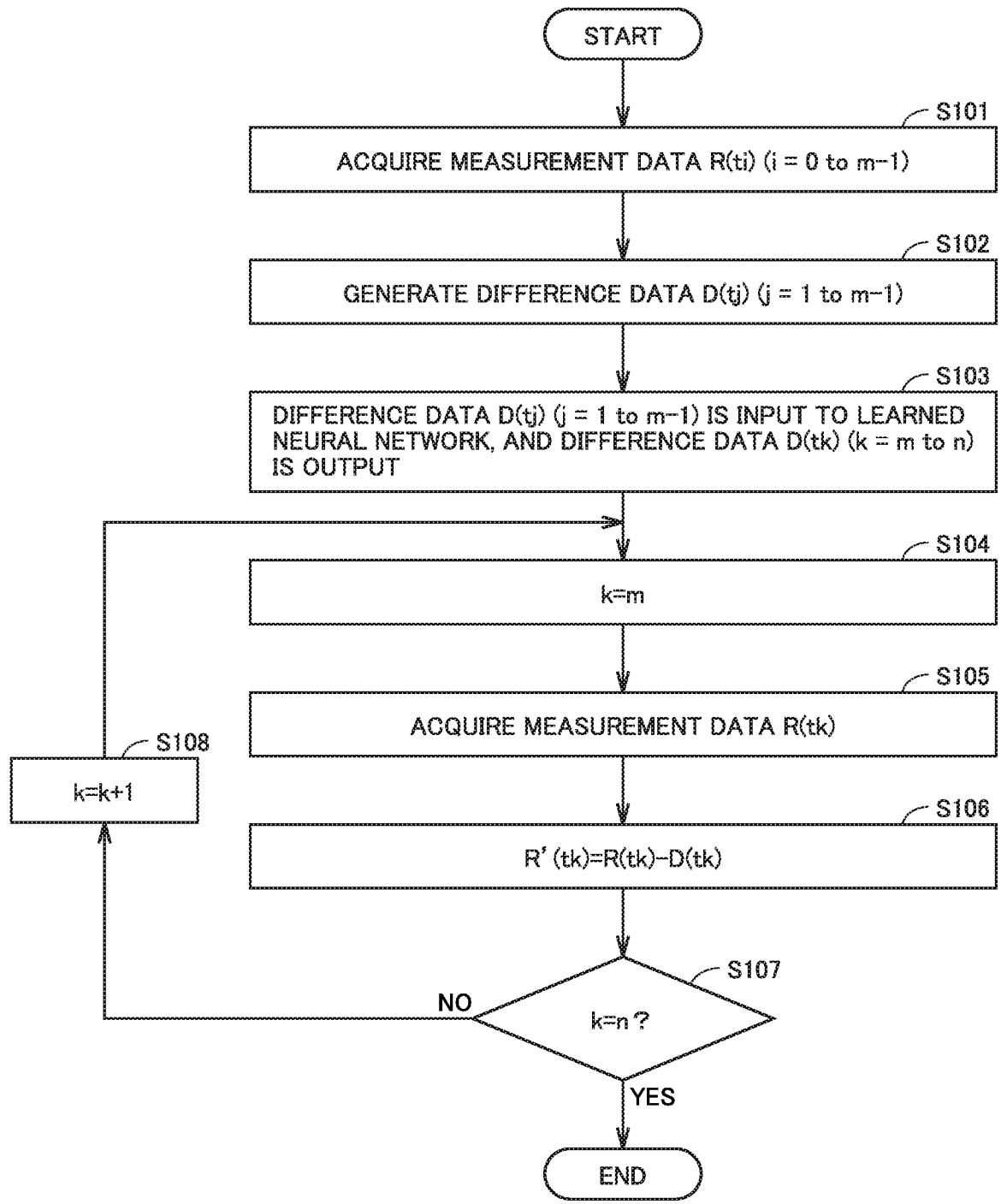
FIG. 6 is a flowchart showing a measurement data correction procedure for analysis device 1 according to the first embodiment.

FIG. 6 is a flowchart showing a measurement data correction procedure for analysis device 1 according to the first embodiment.

In step S101, measurement data acquisition unit 3 acquires measurement data $R(t_i)$ (i=0 to m−1) from measurement device 10.

In step S102, difference data generation unit 6 generates difference data $D(t_j)$ (j=1 to m−1) based on the following formula.

$$D(t_j)=R(t_j)-R(t_0) \quad (2)$$

In step S103, aging degradation estimation unit 4 inputs difference data $D(t_j)$ (j=1 to m−1) to the learned neural network for which parameters are set as learning results, so as to cause the learned neural network to output difference data $D(t_k)$ (k=m to n).

In step S104, k is set to m.

In step S105, measurement data acquisition unit 3 acquires measurement data $R(t_k)$.

In step S106, aging degradation, correction unit 5 corrects measurement data $R(t_k)$ by difference data $D(t_k)$ based on the following formula to thereby obtain corrected measurement data $R'(t_k)$.

$$R'(t_k) = R(t_k) - D(t_k) \quad (3)$$

In step S107, the process completes when k=n is met. When k=n is not met, the process proceeds to step S108.

In step S108, k is incremented by 1 and the process returns to step S104.

As seen from the foregoing, according to the present embodiment, a variation of measurement data due to aging degradation depending on the number of times a consumable has been used is detected. Depending on the variation, the measurement data is corrected. It is therefore unnecessary to take additional measurements beforehand.

Moreover, it is possible to collect and share only the information that concerns variations of the measurement results and that does not include information to be protected such as know how and product information. Thus, aging degradation of measurement data taken by means of consumables that occurred to other users can be used to correct a variation of measurement data. If a user uses the same sample and the same measurement condition as those used by another user, the former user can make use of the information about aging degradation of measurement results that occurs to the other user.

Second Embodiment

Figure 7:
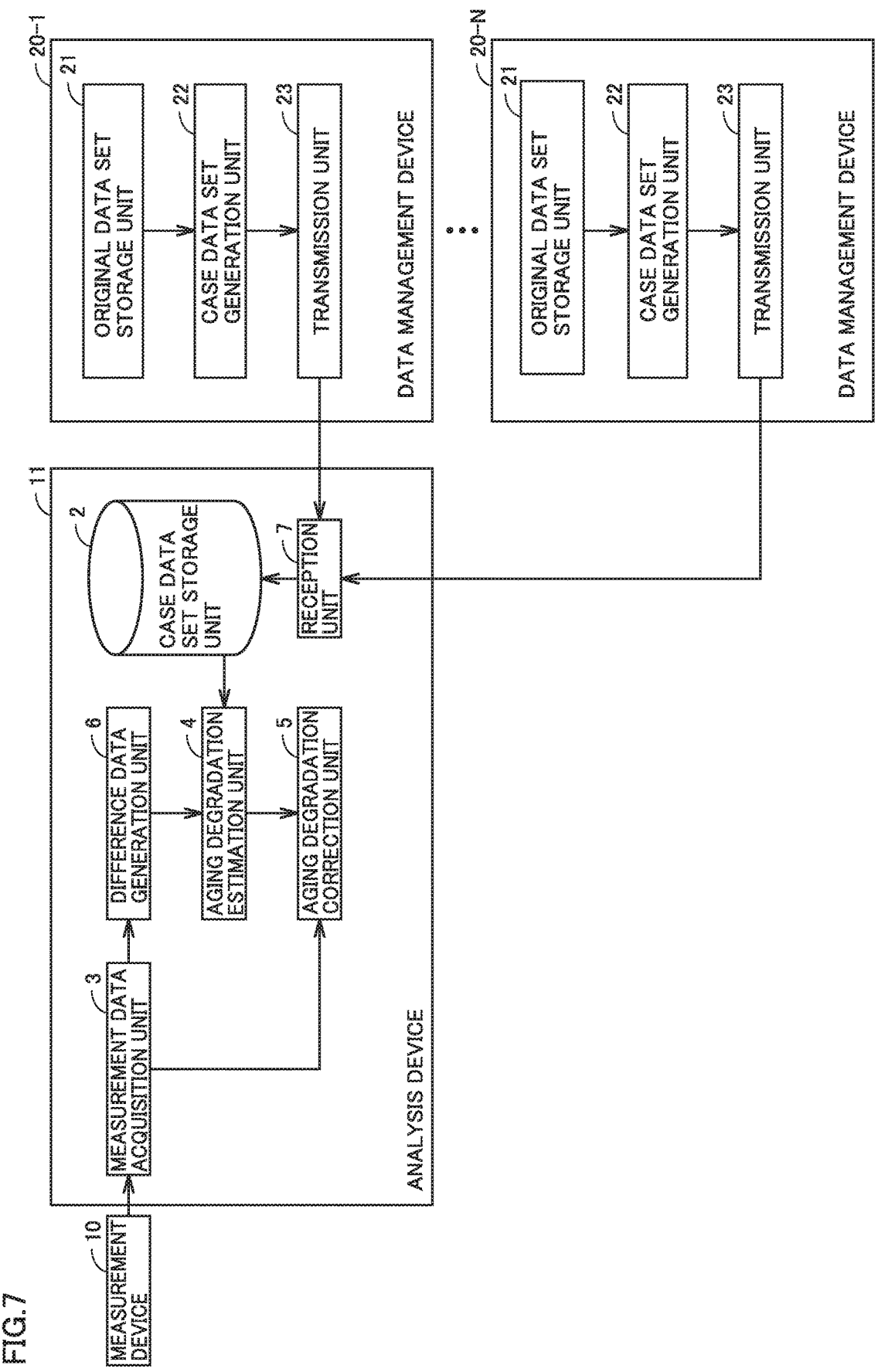
FIG. 7 shows a configuration of an analysis system according to a second embodiment.

FIG. 7 shows a configuration of an analysis system according to a second embodiment.

The analysis system includes N data management devices 20-1 to 20-N and an analysis device 11.

Data management devices 20-1 to 20-N each include an original data set storage unit 21, a case data set generation unit 22, and a transmission unit 23. For example, data management devices 20-1 to 20-N are managed by users 1 to N.

Original data set storage unit 21 stores an original data set including a sample name and an identifier for a measurement condition, as well as measurement data $R(t_0)$ to $R(t_n)$ taken at the initial state and a plurality of points of time.

Case data set generation unit 22 deletes the sample name and the identifier for the measurement condition from the original data set, and subtracts measurement data $R(t_0)$ at the initial state from each of measurement data $R(t_1)$ to $R(t_n)$ taken at respective points of time, to thereby generate difference data $D(t_1)$ to $D(t_n)$. A case data set is made up of difference data $D(t_1)$ to $D(t_n)$.

FIG. 8A shows an example of an original data set. FIG. 8B shows an example of a case data set. Case data set generation unit 22 deletes sample name α and identifier "2" for a measurement condition that are included in the original data set to generate difference data $D(t_1)$ to $D(t_n)$ from measurement data $R(t_0)$ to $R(t_n)$, and accordingly generate case data set.

Transmission unit 23 transmits the case data sets generated by case data set generation unit 22 to analysis device 11.

Analysis device 11 includes the components of analysis device 1 in the first embodiment and additionally includes a reception unit 7.

Reception unit 7 receives the case data sets transmitted from data management devices 20-1 to 20-N to write them in case data set storage unit 2.

Figure 9:
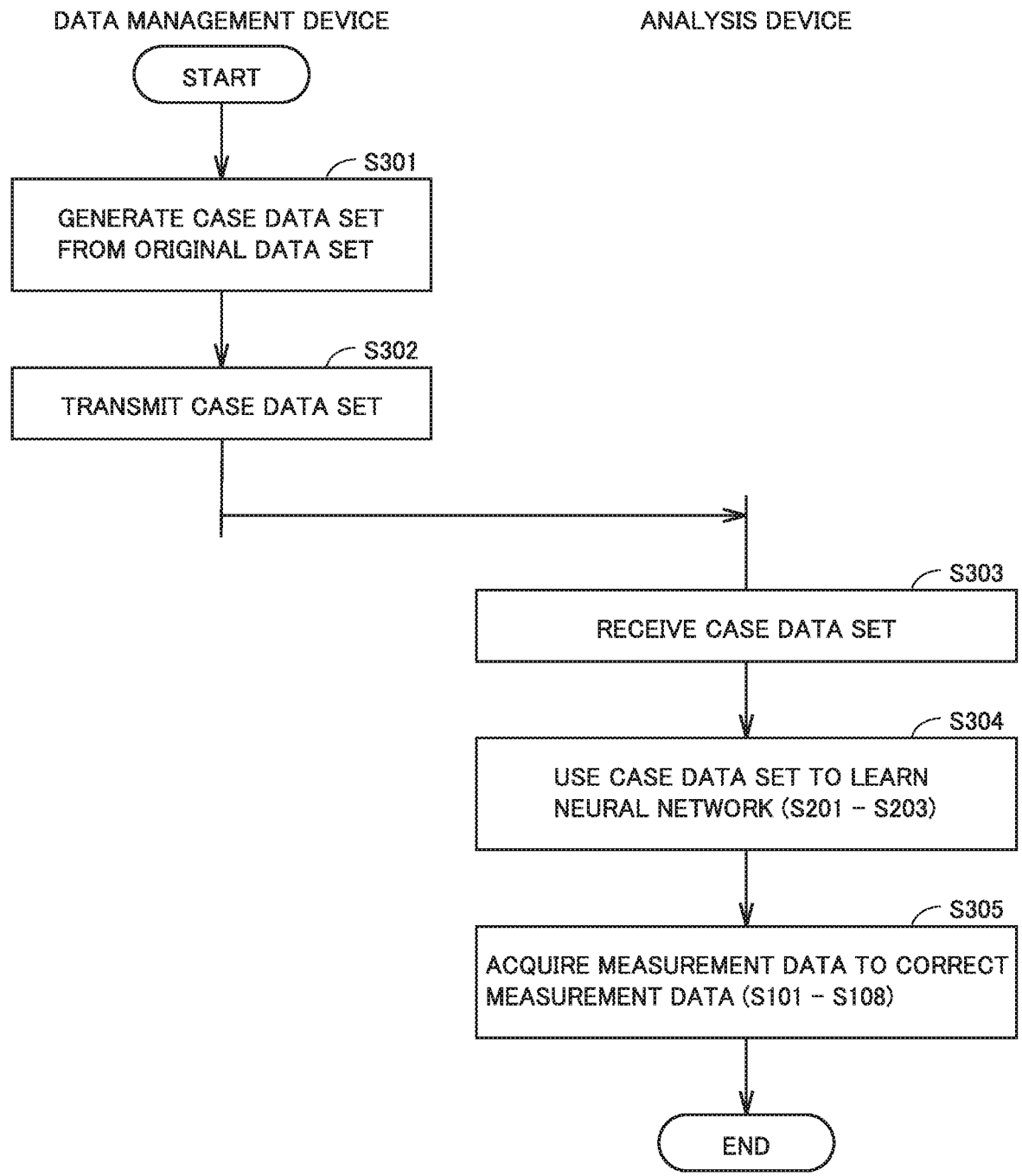
FIG. 9 is a flowchart showing an analysis procedure for an analysis system according to a second embodiment.

FIG. 9 is a flowchart showing an analysis procedure for the analysis system according to the second embodiment.

In step S301, case data set generation unit 22 of data, management devices 20-1 to 20-N deletes the sample name and the identifier for the measurement condition from the original data set and subtracts the measurement data at the initial state from each of the measurement data taken at a plurality of points of time to thereby generate a case data set.

In step S302, transmission unit 23 of data management devices 20-1 to 20-N transmits the case data set to analysis device 11.

In step S303, reception unit 7 of analysis device 11 receives the case data set.

In step S304, analysis device 11 uses the case data set to learn a neural network similarly to steps S201 to 5203.

In step S305, analysis device 11 acquires measurement data and corrects the measurement data similarly to steps S101 to S108.

As seen from the foregoing, according to the present embodiment, data management devices 20-1 to 20-N can generate case data sets that do not include information to be protected such as sample name, measurement conditions and raw measurement data, and provide the generated case data sets to the analysis device.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An analysis system comprising:
an analysis device; and
one or more data management devices,
wherein the analysis device comprises:
a case data set storage unit that stores a plurality of case data sets generated from measurement data taken for a same sample under a same measurement condition;
a measurement data acquisition unit that acquires the measurement data taken by a measurement device at an initial state and at a plurality of points of time;
a difference data generation unit that generates difference data representing a variation from the measurement data taken at the initial state to measurement data taken at each of the plurality of points of time that precede a first elapsed time;
an aging degradation estimation unit that receives the difference data generated by the difference data generation unit at the plurality of points of time preceding the first elapsed time to output difference data representing an estimate value of a variation from the measurement data taken at the initial state to measurement data taken at or after the first elapsed time, based on the plurality of case data sets; and
an aging degradation correction unit that corrects the measurement data taken at or after the first elapsed time, based on the difference data output from the aging degradation estimation unit, wherein
the plurality of case data sets each include difference data representing a variation from measurement data taken at an initial state to measurement data taken at each of a plurality of points of time, for a same sample under a same measurement condition, and
wherein the one or more data management devices each include:
an original data storage unit that manages an original data set, the original data set including a sample name and an identifier for a measurement condition, and measurement data taken at an initial state and measurement data taken at a plurality of points of time;
a case data set generation unit that generates the case data sets by (i) deleting the sample name and the identifier for the measurement condition from the original data set, and (ii) subtracting the measurement data taken at the initial state from the measurement data taken at each of the plurality of points of time; and a transmission unit that transmits the case data sets to the analysis device, the analysis device including a reception unit that receives the case data sets.

2. The analysis system according to claim 1, wherein the aging degradation estimation unit is configured to output the difference data representing the estimate value of the variation from the measurement data taken at the initial state to the measurement data taken at or after the first elapsed time, by inputting, to an aging degradation model, the difference data generated by the difference data generation unit at the plurality of points of time preceding the first elapsed time, wherein the aging degradation model is learned using the plurality of case data sets i) to receive, as an input, difference data representing a variation from measurement data taken at an initial state to measurement data taken at a plurality of points of time after the initial state and before the first elapsed time, and ii) to provide, as an output, difference data representing a variation from the measurement data taken at the initial state to measurement data taken at and after the first elapsed time.

3. The analysis system according to claim 2, wherein the aging degradation model is configured as a neural network.

4. The analysis system according to claim 1, wherein the aging degradation correction unit is configured to subtract the difference data output from the aging degradation estimation unit from the measurement data taken at or after the first elapsed time.

5. The analysis system according to claim 1, wherein the measurement data is waveform data.

6. An analysis method comprising:

generating, by a data management device, case data sets by (i) deleting, from an original data set including (a) a sample name and an identifier for a measurement condition and (b) measurement data taken at an initial state and measurement data taken at a plurality of points of time, the sample name and the identifier for the measurement condition, and (ii) subtracting the measurement data taken at the initial state from the measurement data taken at each of the plurality of points of time;

transmitting, by the data management device, the case data sets to an analysis device;

receiving the case data sets by the analysis device;

learning, by the analysis device, an aging degradation model through use of the case data sets, wherein the aging degradation model is learned (i) to receive, as an input, difference data representing a variation from the measurement data taken at the initial state to the measurement data taken at a plurality of points of time after the initial state and before a first elapsed time, and (ii) to provide, as an output, difference data representing a variation from the measurement data taken at the initial state to measurement data taken at and after the first elapsed time;

acquiring, by the analysis device, measurement data taken by a measurement device at an initial state and a plurality of points of time;

outputting, by the analysis device, difference data representing an estimate value of a variation from measurement data taken at an initial state to measurement data taken at or after the first elapsed time, by inputting, to the learned aging degradation model, difference data representing a variation from the measurement data taken by the measurement device at the initial state to measurement data taken by the measurement device at a plurality of points of time after the initial state and before the first elapsed time; and correcting, by the analysis device, the measurement data taken at or after the first elapsed time, based on the output difference data.

* * * * *